2,847,417
PREPARATION OF IMIDAZOLE COMPOUNDS

William E. Erner, Wilmington, Del., assignor to Houdry Process Corporation, Wilmington, Del., a corporation of Delaware No Drawing. Application July 13, 1956
Serial No. 597,593

10 Claims. (Cl. 260—309)

The present invention relates to the preparation of imidazole and its alkyl and phenyl homologues and is particularly concerned with a novel process which can be operated continuously for easily forming these compounds in readily separable state, obtaining desirably high yields of the imidazoles.

Homologues of imidazole have been suggested for use as metal protectors in synthetic detergent formulations, as textile treating assistants, as copolymers in polyacrylonitrile formulations to make textile containing the same fast to wool dyes, and as intermediates in the preparation of certain fungicides. Imidazoles have not been extensively explored as chemical intermediates because of the lack of a satisfactory commercial process for making the same.

The formation of imidazolines by reaction of an alkylene polyamine with an acylating agent, such as a carboxylic acid or ester thereof, is known from the literature. The process is carried out in liquid phase at moderate temperatures, generally of up to about 150° C. In some instances the known reaction is carried out in separate stages wherein the acylated amino compound is first formed and then condensed in the presence of a mild dehydrating agent to effect ring closure. Conversion of the obtained imidazolines to the corresponding imidazoles has also been described, using dehydrogenation catalysts in finely divided form, and at temperatures of about 150–250° C. and as high as 280° C.

In accordance with the present invention imidazoles are synthesized directly by reaction of an alkylene polyamine with a carboxylic acid or its anhydride, or simple ester, in vapor phase over a solid dehydrocyclization catalyst, preferably over a supported noble metal catalyst of the platinum family. By selection of the appropriate carboxylate, there are obtained in like manner the corresponding alkyl, aryl or aralkyl substituted imidazoles with the substituent in the 2 position of the imidazole ring. The presence of added hydrogen is beneficial in furthering the reaction, avoiding the formation of tarry polymers, and in maintaining desired high catalyst activity over a long useful life period.

In a typical reaction to form 2-methyl imidazole, ethylene diamine and acetic acid are admixed in substantially equal molecular proportions and the mixture preferably preheated on a water bath. The reaction vessel contains platinum-on-alumina catalyst pellets of low acidity, being substantially free of halide (less than about 0.1% halide ion by weight on catalyst), below a layer of inert heat capacity material such as quartz. The catalyst and inert material are brought to desired reaction temperature in the order of 600–1000° F. by passing preheated hydrogen, or an inert hot gas followed by hydrogen, through the vessel. The heated mixture of ethylene diamine and acid (which may now contain or be in the form of the amine-salt) is further heated up to or short of desired reaction temperature by being passed, together with several mols of hydrogen gas, first through the layer of inert material which effects substantially complete vaporization of liquid in the charge prior to contact thereof with the catalyst. High yields of 2-methyl imidazole of good purity are obtained by simple distillation of the reaction effluent.

By using other fatty acids instead of acetic acid for reaction with ethylene diamine under substantially the same conditions as those described above, there are correspondingly obtained unsubstituted imidazole from formic acid and the corresponding higher 2-alkyl homologues from higher fatty acids such as propionic, butyric and valeric acid, etc. The use of aliphatic carboxylic acids of above about a 6 carbon atom straight or branched chain attached to the carboxy group in vapor phase reaction necessitates more precise control of reaction conditions and even then obtains lower yields of the alkyl imidazole because of instability of the products at these high reaction temperatures. For example, substantial cracking of the side chain is evident in the dehydrogenation of n-amyl imidazoline, leading to the formation of lower alkyl imidazoles.

By using unsaturated acids as reactants, there can be obtained the corresponding alkenyl imidazoles. Thus, acrylic acid reacted with ethylene diamine leads to the formation of 2-vinyl imidazole, while from crotonic acid there is obtained 2-propenyl imidazole. Reactions of this type using the unsaturated carboxylates do not equal the results obtained with the saturated carboxylates, since these unsaturates also tend to form heavy polymers and tars which rapidly deactivate the catalyst and contaminate or occlude the catalyst with tarry polymers.

Instead of the acid as such, but not necessarily with equal results, the acid anhydrides may be employed instead of the acid. Thus, since formic acid is dissociated into CO and $H_2O$ and since these, in turn, can be combined under appropriate temperatures and pressures to form the acid, it is possible to use CO as reactant, provided the catalyst employed is not appreciably posioned thereby.

Instead of the aliphatic carboxylic acids there can be employed as acylating agents the readily hydrolyzed esters of these acids, such as methyl and ethyl formate or the corresponding ethyl and methyl esters of acrylic acid.

Instead of the described aliphatic carboxylic acids, there can be employed for reaction with the alkylene diamines, the simple aromatic carboxylic acids to yield aryl imidazoles. Thus, by reaction under conditions above described of ethylene diamine with phenyl acetic acid, one obtains 2-benzyl imidazole, while 2-phenyl 4-methyl imidazole is obtained from benzoic acid and propylene diamine.

In general, the acid (or ester) and the alkylene diamine should be reacted in substantially equal molecular proportions. No advantage has been found to result from excess acid; in fact, the use of excess acid, as in the order of 1.5 mols per mol of diamine, while increasing somewhat the yields of imidazoles does so only with simultaneous production of undesired complex side products, as well as dialkyl imidazole isomers. Slight excess of diamine does not appear to be significantly detrimental.

By using higher alkylene diamines instead of ethylene diamine, di- and poly-substituted imidazoles are obtained. Thus, for example, by reaction of acetic acid with propylene diamine under conditions substantially as above described, 2,4-dimethyl imidazole is obtained.

The operation is benefitted when the catalytic reaction is carried out in the presence of added hydrogen gas. Quantities of hydrogen of at least one mol per mol of diamine are effective in keeping the catalyst free of inactivating deposits and tend to prolong the useful life of the catalyst. In general, it is preferred to employ larger quantities of hydrogen in the order of about 3 to 10 mols per mol of diamine. Any benefits of larger quantities of hydrogen, as in the order of 15 mols or more, would be more than offset by the increased costs of handling. It will be understood, of course, that the hydrogen-containing gas is recovered from the products effluent and recycled to the process, together with small amounts of fresh hydrogen to maintain the desired purity of the recycled hydrogen-rich gas stream.

The alkylene diamine is fed to the catalytic reaction zone at a volumetric space rate (determined as liquid) of at least 0.5 volume per hour per volume of catalyst. Higher space rates are preferred, as in the order of 1 to 3 volumes of diamine, or more.

Among the dehydrocyclization catalysts that can be employed in the described process, one that is particularly stable for high temperature operation and possesses good activity is supported cobalt molybdate catalyst in which the cobalt molybdate is in the form of a true molecular compound ($CoMoO_4$) as distinguished from a mixture of the oxides of cobalt and molybdenum. Such catalyst can be prepared in a number of ways. In a preferred method, an aqueous solution of a soluble cobalt salt, such as cobalt nitrate, and an ammoniacal solution of a soluble molybdate, such as ammonium molybdate are mixed in substantially stoichiometric amounts in the presence of a stabilized alumina base to produce hydrated cobalt molybdate impregnated on alumina. Drying the impregnated base and calcining at a temperature in excess of 445° C. removes the water of hydration from the cobalt molybdate.

The concentration of cobalt molybdate is not critical and its weight percentage with respect to alumina or other porous support may be varied over a considerably wide range. A typical catalyst of this class comprises 10 percent by weight of cobalt molybdate on alumina of high porosity, such as an alumina having a surface area in the order of 230 square meters per gram. Prior to use the catalyst is preferably reduced in a stream of hydrogen.

Supported noble metal catalysts useful in the described process include those comprising 0.1 to 5% by weight platinum or palladium supported on silica gel, on charcoal or activated carbon, or on magnesia.

The preferred catalysts comprise up to 2% platinum on an activated alumina support substantially free of halide ions. Such catalysts can be prepared by impregnation of the alumina with a solution of platinum nitrate or with solutions of other halide-free platinum salts or complexes, as for example commercial "P-salt"

$$[(NO_2)_2 \cdot Pat \cdot (NH_2)_2]$$

When the impregnating solution employed is the more usual chloroplatinic acid type or other soluble platinum halide salt or complex, and the alumina impregnated therewith is thereafter subjected to the conventional reduction with hydrogen, the halide is nevertheless retained in the catalyst in chemical association with the alumina or otherwise. Platinum-on-alumina catalysts containing such halide have pronounced activity for promoting acid-catalyzed reactions including isomerization, olefin polymerization and cracking, in addition to the hydrogenation-dehydrogenation function of the platinum. To remove the halide from the platinum-alumina catalyst, accordingly, the catalyst is treated with reducing gas (e. g., hydrogen) and steam, until the halide content is reduced to below 0.1% halide ion by weight of catalyst.

A convenient method for preparing platinum-alumina catalyst of low halide content involves subjecting the halide-containing platinum-alumina catalyst to a reducing atmosphere containing 25 to 75 mol percent steam and 10 to 75 mol percent of a reducing gas, such as hydrogen, and if desired or required, the balance of inert gas, such as nitrogen. The treatment with such gaseous mixture is effected at temperatures in the range of 700 to 1000° F. for 1 to 36 hours. A superior catalyst employed in the process of the invention is one thus prepared comprising, prior to steam treatment, 0.5% platinum, 0.5% chloride and 99% gamma alumina.

Catalysts containing other noble metals of the platinum family, such as palladium, can be similarly prepared on alumina employing halide-free impregnating solutions of such noble metal compounds or by subsequent steaming to remove halide.

When noble metal catalysts are employed, supported on carriers other than those composed of or comprising alumina, no difficulty is encountered with respect to the halide from the impregnating metal solution since the same is substantially removed during conventional reduction. Suitable carriers of this type for platinum or other noble metal of the platinum family, already named above, include activated carbon, magnesia and silica. There also come into consideration supported platinum and other noble metal catalysts on silica-alumina dried gel carriers. Removal of halide, when chloroplatinic acid or other halide-containing impregnating solution is employed in their preparation, can be effected by steaming in a reducing atmosphere in the same manner as above described for the gamma alumina supported catalysts. Since silica-alumina of itself contributes a high acid function, such carrier should be subjected to an attenuating treatment as by heat treatment in a steam atmosphere or by other methods already known to the art. While such catalysts on supports other than activated alumina (gamma alumina) are operative to greater or less degree in the imidazole synthesis reactions according to the invention, these are not to be considered equal in all respects in yield and selectivity to the preferred platinum-alumina catalysts of the described halide-free or low halide content.

The present invention as hereinbefore described, in general, involves reacting the basic salts formed by addition of a fatty acid or other simple organic carboxylic acid to a vic-diamine, over low acidity supported dehydrogenation catalyst of the platinum type in the presence of hydrogen, to obtain directly imidazole type compounds. If instead of the free carboxy acid one employs an ester thereof, the initial mixture of the ester with the vic-diamine will produce the amide which reacts in similar manner and under the same conditions to produce the imidazole compounds as those described for the basic salts, only one instead of two mols of water being split off in the ring closure process. The invention can also be practiced by starting with imidazoline compound, such as the unsubstituted or short chain alkyl-substituted imidazoline, which is dehydrogenated to the corresponding imidazole by the described catalytic process; when starting with aryl imidazolines, the corresponding aryl imidazoles are obtained.

It will be seen from the foregoing that generic reaction in accordance with the invention is that between an alkylene diamine [1] and a carboxylate [2] (acid, ester, or anhydride) in vapor phase over a dehydrocyclization catalyst to produce an imidazole [3], thus:

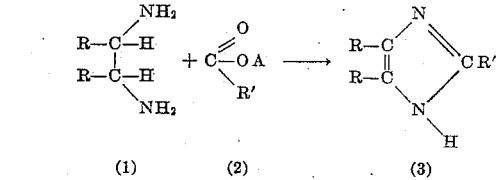

(1)      (2)      (3)

The alkylene diamine [1] is one in which R is hydrogen, or an alkyl radical having 1 to 4 carbon atoms and in which the $NH_2$ groups of the diamine are on adjacent carbon atoms. Either one but not both of the $NH_2$ groups may be substituted by an R group, as defined, thereby obtaining N-substituted imidazoles therefrom.

The carboxylate [2] is that of a mono-carboxylic acid, ester or anhydride in which R' is hydrogen or an alkyl radical of preferably 1 to 5 carbon atoms, a phenyl radical (as in benzoic acid) or a phenalkyl radical (such as $C_6H_5$—$CH_2$[benzyl] as in phenyl acetic acid); and where A is hydrogen (in the case of the freed acid) or is R or R' as defined, furnishing an ester which is readily hydrolyzable, or A is an acyl radical of an acid anhydride

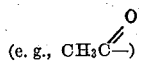
(e. g., $CH_3\overset{O}{\overset{\|}{C}}$—)

Aromatic acids which contain a functional group ortho or para to the carboxy group do not react satisfactorily to form imidazoles, since such acids tend to decarboxylate rather than dehydrocyclize. This is the case with such acids as anthranilic and salicyclic as well as their para substituted isomers. The unsaturated acids, as stated above, while reactive to a certain extent to produce imidazoles, are not among the preferred acids because of the polymers and tars formed thereby.

EXAMPLE I 211 parts by weight of ethylene diamine (85% purity) were admixed with an equal quantity by weight of C. P. acetic acid (3 mols diamine to 3.5 mols acid). The temperature developed on mixing (heat of neutralization) was such as to put the reagents into mutual solution. The homogeneous liquid mixture obtained was cooled to about 100° C. and charged through a heated liquid feed system into a continuous reactor which consisted of a packed column comprising a preheater section (broken quartz chips) occupying about one-half of the total bed depth, and a reactor section filed with supported platinum catalyst. The reactor section was maintained at 800–820° F. Simultaneously with the passage of the liquid charge, there was passed through the reactor 4 mols of hydrogen gas per mol of diamine, the liquid mixture being charged at the rate of 0.75 volume per hour per volume of catalyst. Over a period of about 6 hours, 205 parts by weight of the liquid mixture were passed through the system. Seventy-five parts by weight of a crystalline product were recovered in the condenser and 92.5 parts by weight of liquid product collected in the receiver. From the liquid product an additional 43.5 parts by weight of crystalline material were recovered on redistillation for a total recovery of the non-purified 2-methyl imidazole of 118.5 parts by weight, having a melting point of 136–141° C., or 91 mol percent of the theoretical yield.

A mixed melting point of 2-methyl imidazole from 2-methyl imidazoline and the above showed no change in melting point from that of the above product. The above-obtained 2-methyl imidazole is estimated to be of 95%+ purity.

The cooling of the homogeneous liquid in the above experiment and in subsequent experiments described below should be carried out to temperatures of about 110° C. or slightly lower, but above that temperature at which crystallization of the amine salt would take place (50° C. for the ethylene diamine acetate).

*Catalyst preparation*

The catalyst employed in the foregoing example was prepared by treating activated alumina in the form of 4 mm. cylindrical pellets with 10% acetic acid at room temperature for an hour followed by rinsing in distilled water and thereafter impregnating the pellets with a solution of chloroplatinic acid in an amount to effect a deposit of 0.5% platinum therein. The impregnated pellets were then subjected to an air stream and dried at about 275° F. The dried pellets were then treated with a hydrogen gas stream at about 900° F. for an hour to convert the chloroplatinate to metallic platinum following which the catalyst was dehalided by treatment with a mixture of 10% hydrogen and 90% steam, at 900° F., and again subjected to 100% hydrogen treatment at the same temperature for another hour. The finished catalyst contained 0.1% chloride by weight, 99.4% gamma alumina and 0.5% platinum.

EXAMPLE II 212 grams ethylene diamine were mixed with 157 grams of formic acid (88%) and the heat of neutralization dissipated by cooling to below 110° C. Two-hundred milliliters of the obtained liquid were charged to 40 ml of the catalyst (same as in Example I) in the reactor through the heated feed system with 4 mols of hydrogen at the 0.75 liquid space rate as described in Example I. At a reactor temperature of 810–820° F. the yield was 147.5 grams of liquid product, which, on distillation, yielded 35 grams of imidazole (B. Pt. 256–257° C., M. Pt. 42–80° C.) or 30 mol percent of theoretical; which on purification by recrystallization from benzene solution had a melting point of 86–88° C. This is the first known synthesis of imidazole from formic acid and ethylene diamine. Imidazole, per se, has not heretofore been synthesized from these reagents since formic acid and ethylene diamine do not form imidazoline.

EXAMPLE III 141 grams of ethylene diamine and 204 grams of valeric acid (98% pure) were blended and charged in warm liquid state to the reactor at 645–670° F. containing the same catalyst as in Example I. The lower temperature was chosen to avoid thermal dissociation of the fatty acid. At a 0.75 liquid space rate and 4/1 hydrogen, the reaction over the same catalyst as in the previous examples, gave 127 grams of liquid product from 180 ml.=169 grams of charge. On distillation, 76 grams of 2-n-butyl imidazole were recovered (B. Pt. 291–294° C.. M. Pt. 32–41° C.) giving a 60 mol percent yield. This compound is not described in previous available literature.

EXAMPLE IV 114 grams of ethylene diamine and 196 grams of benzoic acid were blended and fed warmed to the reactor and catalyst of Example I held at 700–710° F. with 4 mols $H_2$/base charge, at a liquid space rate of 1.125 vol of liquid/cat. vol./hr. A total of 120 grams or 114 ml. was passed through the catalyst mass over 2½ hours giving a yield of 86.5 grams of liquid product, which, on distillation, gave 52.5 grams of 2-phenyl imidazole (B. Pt. 337–347° C.; M. Pt. 140–144° C.) at a final yield of 58 mol percent.

EXAMPLE V 2-ethyl imidazoline was prepared from 534 ml. ethylene diamine and 610 ml. propionic acid, which were heated together with 50 ml. of benzene in a resin kettle to approximately 140° C. where water began being evolved, condensed and removed in a Dean-Stark trap. The temperature rose to about 200° C., when heating was discontinued; the reaction vessel cooled to below 100° C., at which point 50 grams of Mg turnings were added and heating recommenced. The Dean-Stark trap was replaced by a regular condenser and product was distilled to obtain 200 grams of a solid product boiling 204–207° C. and 100 grams of a solid product boiling 207–212° C. making 300 grams in all. A series of such 2-alkyl imidazolines was prepared to test the one step dehydrogenation by catalytic means, thus:

2-methyl imidazoline _____ B. Pt., 197° C.
2-ethyl imidazoline _____ B. Pt., 208° C.
2-amyl imidazoline _____ B. Pt., 243° C.

200 ml. of a benzene solution containing 77.5 grams of 2-ethyl imidazoline were charged to the catalyst reactor system similar to that used in Example I except that no charge heater was needed.

Operating conditions:
  400 grams imidazoline/liter cat./hr.
  2 mol $H_2$/mol imidazoline charged
  800° F. reactor temperature
  (0.90 g./cc. density of charge or roughly 1 vol of benzene solution/vol. cat./hr.)

Over approximately 5½ hours the total charge was passed and after the evaporation of benzene solvent, 74.5 grams of solid product were recovered melting at 61–64° C., for a 96 mol percent yield on 2-ethyl imidazoline charged.

Imidazoles synthesized from (a) alkylene diamines and carboxylic compounds, or (b) from imidazolines are shown in the following tabulation:

IMIDAZOLE SYNTHESIS

| Alkylene | Diamine | Carboxylic Compounds | Imidazole | Yield |
|---|---|---|---|---|
| Ethylene | Diamine | Formic | Imidazole | 30 |
| Do | do | Acetic | 2-methyl imidazole | 91 |
| Propylene | do | do | 2,4-dimethyl imidazole | 81.5 |
| Ethylene | do | Propionic | 2-ethyl imidazole | 66 |
| Do | do | n-butyric | 2-n-propyl imidazole | 65 |
| Do | do | n-valeric | 2-n-butyl imidazole | 60 |
| Do | do | n-caproic | 2-n-amyl imidazole | 31 |
| Do | do | Benzoic | 2-phenyl imidazole | 58 |
| Do | do | Phenylacetic | 2-benzyl imidazole | 39 |
| Do | do | Nicotinic | 2-(3-pyridyl)-imidazole | 41 |

IMIDAZOLINES ⟶ IMIDAZOLES

| Imidazoline | Conditions | Imidazole | Yield |
|---|---|---|---|
| 2-methyl Imidazoline | 14% solution in benzene; 0.4 vol./vol./hr; 2 H₂ mol/mol imidazoline; 800–880° F | 2-methyl Imidazole | 95%. M. Pt. 136–140° C. |
| 2-ethyl Imidazoline | 43% solution in benzene; 0.4 vol./vol./hr; 2 H₂ mol/mol imidazoline; 800° F | 2-ethyl Imidazole | 96%. M. Pt. 61–64° C. |
| 2-amyl Imidazoline | 50% solution in benzene; 0.4 vol./vol./hr; 2 H₂ mol/mol imidazoline; 800° F | 2-amyl Imidazole | 10–20%. |

Obviously many modifications and variations of the present invention as hereinbefore set forth may be made without departing from the spirit and scope thereof and therefore only such limitations should be imposed as are indicated in the appended claims.

I claim:

1. The method which comprises admixing an alkylene diamine of the Formula 1

[1]

[2]

with a mono carboxylate of the Formula 2 wherein in [1] the R substituent is selected from the group consisting of hydrogen and alkyl radicals of 1 to 4 carbon atoms and in which formula the several R substituents may differ from one another, and in [2] the R' substituent is selected from the group consisting of hydrogen, alkyl radicals, phenyl, and benzyl radicals; and the A substituent is selected from the group consisting of acyl residues of aliphatic acid anhydrides, and R and R' substituents; vaporizing the resulting admixture and contacting the obtained vapors with a solid dehydrocyclization catalyst at temperatures in the range of 600 to 1000° F., said catalyst being composed of a noble metal of the platinum family supported on a carrier.

2. The method according to claim 1 wherein the catalyst is composed of platinum supported on an alumina carrier and is substantially free of halide.

3. The method according to claim 2 wherein the catalyst is one prepared by impregnation of an activated alumina carrier with chloroplatinic acid followed by dehalogenation of the impregnated carrier to a content of not more than 0.1% Cl.

4. The method according to claim 1, wherein, said contacting with catalyst is effected in the presence of at least one mol of added hydrogen per mol of diamine compound in said vapors.

5. The method which comprises admixing a lower vicinal alkylene diamine with an alkyl carboxylic acid of not more than 6 carbon atoms, and passing the resulting mixture into a reaction zone as liquid to effect vaporization thereof followed by contact of the vapors with platinum-on-alumina catalyst substantially free of halide, in the presence of free hydrogen and at temperatures in the range of 600–1000° F., and separating a compound containing an imidazole nucleus from the reaction effluent.

6. The method according to claim 5 wherein said alkylene diamine is ethylene diamine.

7. The method according to claim 6 wherein said acid is acetic acid.

8. The method according to claim 6 wherein said acid is formic acid.

9. The method according to claim 5 wherein said acid is acetic acid.

10. The method according to claim 5 wherein said acid is propionic acid.

References Cited in the file of this patent

UNITED STATES PATENTS

| 2,399,601 | Kyrides et. al. | Apr. 30, 1946 |
| 2,404,299 | Kyrides et. al. | July 16, 1946 |

FOREIGN PATENTS

| 703,899 | Germany | Mar. 19, 1941 |
| 484,862 | Great Britain | May 11, 1938 |

OTHER REFERENCES

Zelinsky et al.: Ber. Deut. Chem., vol. 59, pp. 25900–93 (1926).